United States Patent
Vlaminck et al.

(10) Patent No.: US 9,531,559 B1
(45) Date of Patent: Dec. 27, 2016

(54) SECURED DEVICE ACCESS IN A DEVICE AUTOMATION SYSTEM

(71) Applicant: SmartThings, Inc., Washington, DC (US)

(72) Inventors: Scott David Vlaminck, Saint Paul, MN (US); Jesse Curtis O'Neill-Oine, Lauderdale, MN (US); Robert Max Florian, Jr., Olney, MD (US); Jeffrey Hagins, Santa Rosa Valley, CA (US)

(73) Assignee: SmartThings, Inc., Palo Alto, CA (US)

( * ) Notice: Subject to any disclaimer, the term of this patent is extended or adjusted under 35 U.S.C. 154(b) by 31 days.

(21) Appl. No.: 14/159,400

(22) Filed: Jan. 20, 2014

Related U.S. Application Data

(63) Continuation-in-part of application No. 13/838,630, filed on Mar. 15, 2013.

(51) Int. Cl.
*H04L 12/28* (2006.01)
*H04L 12/24* (2006.01)

(52) U.S. Cl.
CPC ....... *H04L 12/2807* (2013.01); *H04L 41/0803* (2013.01)

(58) Field of Classification Search
CPC ............ H04L 9/14; H04L 12/24; H04L 12/28; H04L 29/08; H04L 67/10; H04L 67/32; H04L 12/2807; H04L 41/0803
USPC .................................................. 709/203, 220
See application file for complete search history.

(56) References Cited

U.S. PATENT DOCUMENTS

| | | | |
|---|---|---|---|
| 5,905,442 A | 5/1999 | Mosebrook et al. | |
| 6,131,118 A * | 10/2000 | Stupek, Jr. ............. | G06F 9/542 709/223 |
| 6,356,949 B1 | 3/2002 | Katsandres et al. | |
| 6,421,719 B1 * | 7/2002 | Lewis ..................... | G06F 21/30 709/220 |
| 7,551,071 B2 | 6/2009 | Bennett et al. | |
| 8,135,796 B1 * | 3/2012 | Slaughter et al. ........... | 709/217 |
| 8,271,629 B1 | 9/2012 | Winters | |
| 2002/0062338 A1 | 5/2002 | McCurley et al. | |
| 2002/0152298 A1 | 10/2002 | Kikta .................. | H04L 12/2803 709/223 |
| 2003/0187920 A1 * | 10/2003 | Redkar ........................ | 709/203 |
| 2005/0022210 A1 * | 1/2005 | Zintel et al. .................. | 719/318 |
| 2007/0143162 A1 | 6/2007 | Keever et al. | |
| 2010/0083356 A1 | 4/2010 | Steckley et al. | |
| 2010/0217837 A1 | 8/2010 | Ansari et al. | |
| 2011/0026436 A1 * | 2/2011 | Karaoguz et al. ............ | 370/254 |
| 2011/0314163 A1 * | 12/2011 | Borins et al. ................. | 709/227 |
| 2013/0223279 A1 * | 8/2013 | Tinnakornsrisuphap et al. ................................ | 370/254 |
| 2013/0273855 A1 | 10/2013 | Cherian et al. | |
| 2014/0157224 A1 * | 6/2014 | Capuozzo et al. ............ | 717/100 |

(Continued)

*Primary Examiner* — Wing F Chan
*Assistant Examiner* — Leon Y Tseng
(74) *Attorney, Agent, or Firm* — Beyer Law Group LLP

(57) ABSTRACT

A secured device access method is implemented in a web-based device automation system whereby the configuration of an automation application for specific devices in a user's automation environment and the installation of the automation application define the security scope for the automation application. Once the automation application is configured and installed, the automation application is only allowed access to the authorized devices in the user's automation environment and the automation application may not access other devices in the user's environment that have not been authorized.

14 Claims, 12 Drawing Sheets

(56) References Cited

U.S. PATENT DOCUMENTS

2014/0181521 A1* 6/2014 Hemphill et al. ............ 713/171
2015/0150097 A1* 5/2015 Bush ....................... G06F 21/31
726/4

* cited by examiner

Event Handler Code

```
onDoorOpen (Event event, Preferences preferences) {
        // if the event occurred on a device defined in preferences
        if (preferences.onDevices.contains(event.device)) {

// Now turn on a light or multiple lights based on user preferences
        eachSwitch (preferences.targetDevices) {
                it.on
        }
}
```

FIG. 4A

Event Handler creating Event Wiring

```
onMotionDetected (Event event, Preferences preferences) {
        if (!event.actionTaken) {              // #1 - see if hard-wiring has already
        preferences.light1.on                  // #2 - turn on the specified light
        wiring = new Wiring ( event.device,    // #3 - create hard-wiring
                              event.eventType,
                              preferences.light1.device,
                              preferences.light1.deviceType.commands.on)
        wiring.save                            // #4 - Save the wiring
        }
        else {
        }
}
```

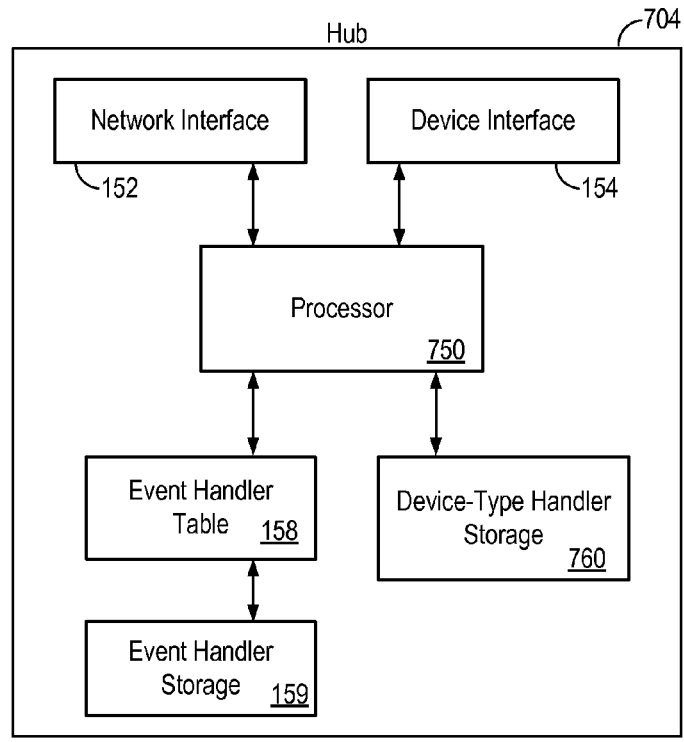
FIG. 10(a)
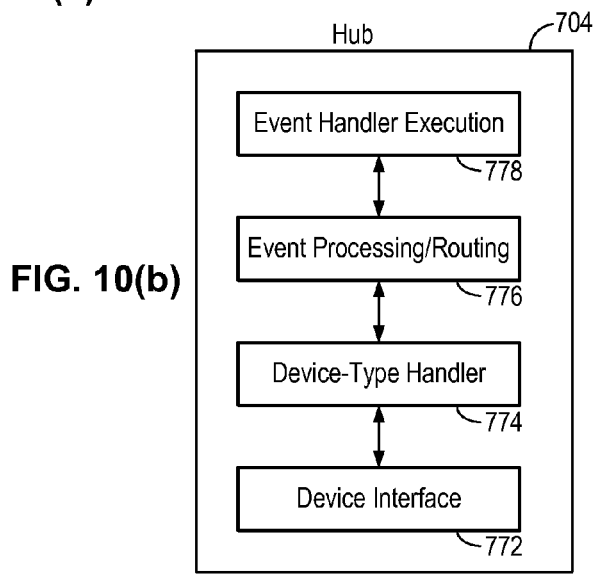
FIG. 10(b)
FIG. 10

SECURED DEVICE ACCESS IN A DEVICE AUTOMATION SYSTEM

CROSS REFERENCE TO OTHER APPLICATIONS

This application is a continuation in part of co-pending U.S. patent application Ser. No. 13/838,630, entitled DISTRIBUTED CONTROL SCHEME FOR REMOTE CONTROL AND MONITORING OF DEVICES THROUGH A DATA NETWORK, filed Mar. 15, 2013, which is incorporated herein by reference for all purposes.

BACKGROUND OF THE INVENTION

The idea of the "smart home" has been around since the 1950s but never became mainstream. However, with the advent of the Internet and the wide adoption of smartphones, the smart home concept or home automation can now be realized where appliances and devices in a home can be connected to the Internet and be capable of being monitored and controlled remotely. However, implementation of Internet controllable devices requires knowledge of networking, server management, communication protocols and also network security.

BRIEF DESCRIPTION OF THE DRAWINGS

Various embodiments of the invention are disclosed in the following detailed description and the accompanying drawings.

FIG. 4, which includes FIGS. 4A and 4B, illustrate examples of an event handler and an event handler generating event wiring.

FIG. 10, which includes FIGS. 10(a) and 10(b), illustrates an example of a hub incorporating device-type handlers.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
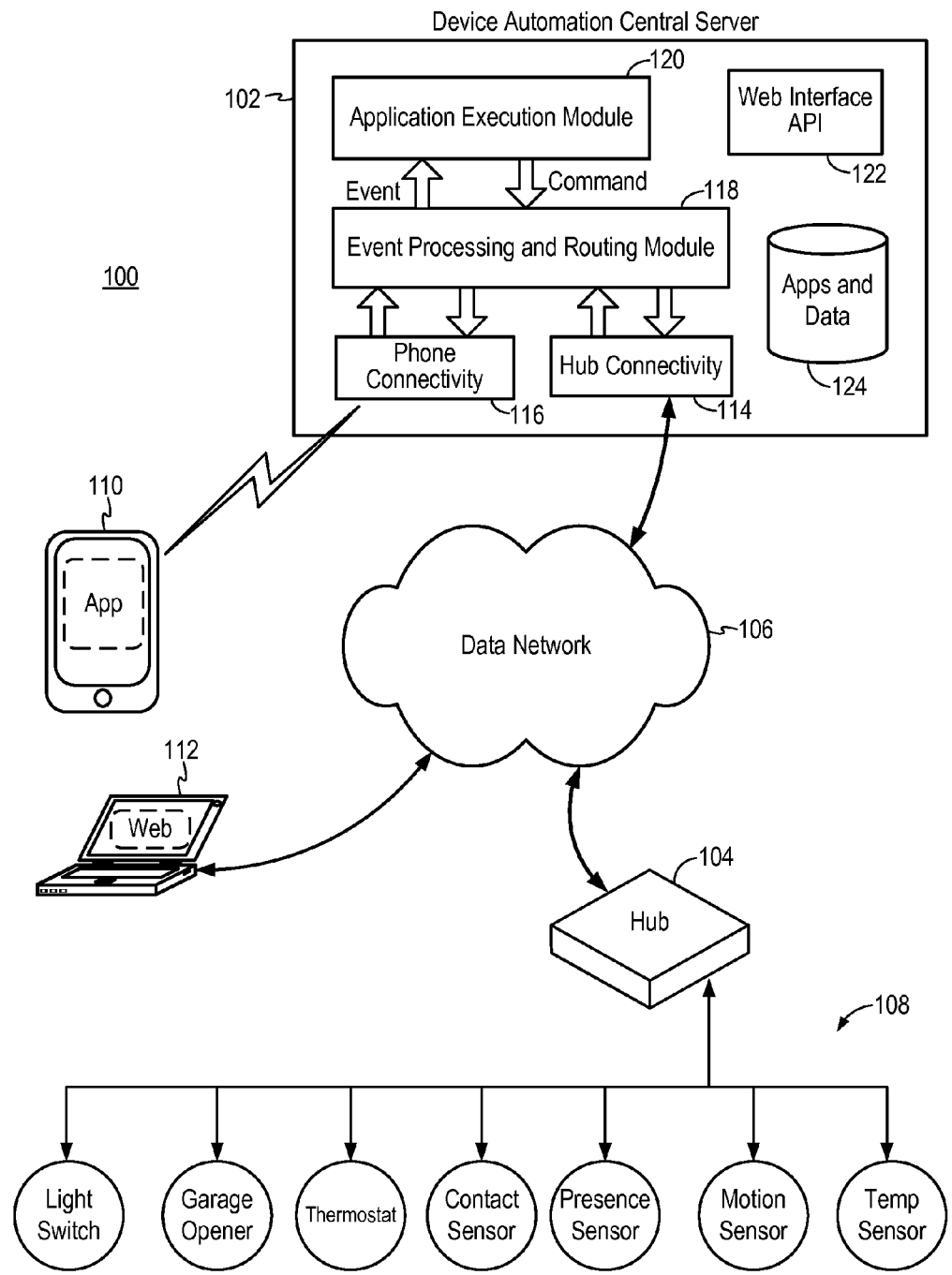
FIG. 1 is a block diagram illustrating a web-based device automation system in embodiments of the present invention.

FIG. 1 is a block diagram illustrating a web-based device automation system in embodiments of the present invention. Referring to FIG. 1, a web-based device automation system 100 ("system 100") includes a web-based device automation central server 102 ("central server 102") communicating with a hub 104 over a data network 106, such as the Internet or an intranet. Central server 102 implements the processing and control for remotely monitoring and controlling one or more devices 108 over the data network 106. As thus configured, web-based device automation system 100 enables everyday objects to respond to digital controls. In one embodiment, central server 102 is a server connected to and communicating with hub 104 over the data network 106. Hub 104 is a module installed in an environment, which can be a home or an office or an outdoor location, for connecting one or more devices or appliances 108 in that environment to the data network 106. In operation, hub 104 functions as a bridge between the data network 106 and devices 108 to enable devices 108 to be connected to the data network. In this manner, devices 108 can be monitored and controlled through hub 104 and web services provided by central server 102 without requiring each device 108 to implement full network communication capability.

In the example shown in FIG. 1, hub 104 is connected to a group of devices 108 including sensing devices that generate data and actuating devices that control a function. The group of devices 108 can include everyday devices and appliances found in a home or an office. In the present illustration, the group of devices 108 includes a contact sensor, a temperature sensor, a motion sensor, and a presence sensor as sensing devices. Furthermore, the group of devices 108 includes a thermostat, a garage door opener, and a light switch as actuating devices. Devices 108 shown in FIG. 1 are illustrative only and not intended to be limiting. The web-based device automation central server of the present invention can be applied to monitor and control many types of devices applied in any environment. In the following description, the web-based device automation system is described as being deployed in an automation environment, which can be a home automation environment or other automation environment. The web-based device automation system described herein can be applied to an automation environment deployed in any types of premises, such as an office, a warehouse, a factory, and other public or private premises.

Each of the devices 108 communicates with hub 104 to receive commands for actions to be performed or to report status or data. Devices 108 may communicate with hub 104 through a wired or a wireless connection. In one embodiment, devices 108 communicate with hub 104 using a low-power wireless protocol, such as Zigbee and Z-wave. Hub 104 in turn is connected to the data network 106, typically through a wired connection. In one embodiment, hub 104 maintains a persistent connection to the data network 106 to enable continuous monitoring and control of devices 108 by central server 102.

Central server 102 also supports communication with network-enabled computing devices, such as laptop computers, tablet computers, or smartphones. In the example shown in FIG. 1, a user may access the services provided by central server 102 using a smartphone 110 and a wireless or cellular connection to the data network 106. In another example, a user may access the services provided by central server 102 using a laptop computer 112 running a web user interface on a web browser. The laptop computer 112 may connect to the data network through a wired or wireless connection.

In the present illustration, system 100 includes a single hub 104 communicating with a set of devices 108. The configuration shown in FIG. 1 is illustrative only and not intended to be limiting. In other embodiments, system 100 may include two or more hubs 104, each hub communicating with its own set of devices 108. Central server 102 is informed of the configuration of the hubs and the associated devices to enable remote control and monitoring of the devices through their respective hubs. In embodiments of the present invention, the configuration of devices and hubs and their interconnection in a user's environment is sometimes referred to as a physical graph. More specifically, a physical graph describes the devices that are in a user's environment and the interconnection of the devices and one or more hubs in the environment. The physical graph, being a virtual representation of the physical devices in the user's environment, enables visibility into the status of devices and the events the devices are generating within the user's environment. The physical graph also enables control over the state of the devices and the events generated by the devices.

FIG. 1 further illustrates an embodiment of central server 102. The example shown is a representation of logical components that may be included in central server 102, in some embodiments. In the embodiment shown in FIG. 1, central server 102 includes a hub connectivity interface 114 configured to communicate with hub 104 over the data network 106 and a phone connectivity interface 116 configured to communicate with mobile devices, such as smartphone 110, over a cellular network. Hub connectivity interface 114 implements the necessary communication protocols to communicate with the hub 104 over the data network 106 and phone connectivity interface 116 implements the necessary communication protocols to communicate with mobile devices over a cellular network. In one embodiment, hub connectivity interface 114 and phone connectivity interface 116 maintain a persistent connection to the data network 106 and to one or more cellular network to enable continuous connection to the hubs in the system and to one or more mobile devices accessing the system.

Central server 102 includes an event processing and routing module 118 configured to process and route events within system 100. More specifically, the functions of the event processing and routing module 118 includes receiving and processing event data received from the hub connectivity interface 114 and determining how events should be routed in the system. Central server 102 further includes an application execution module 120 configured to handle execution of automation applications, also referred to as "Apps" on the central server, as will be explained in more detail below. The central server 102 includes a web interface 122 supporting communication with web services, APIs and mobile applications. Finally, central server 102 includes a database 124 of automation applications, and data, such as user login information, event data and other data. In physical implementations, the central server 102 may include one or more processors performing the functions of the logical blocks shown in FIG. 1.

Automation applications or Apps are software components of the web-based device automation system 100 used to monitor, control and automate devices 108 that are installed in an environment or at a location. In system 100, an automation application or an App is a collection of event handlers or a collection of event handlers and controls that operates to respond to various types of events that occur within system 100. In the present description, an event handler is the software component for servicing an event to which an App is subscribed. In brief, an App defines event handlers, subscribes to events and the App is invoked when a specified event occurs.

In system 100, an event includes activities occurring at devices 108, or controls or queries received from web applications from mobile devices or from web services. For example, an event can be the detection of an opened door, the detection of the presence of a certain person at a certain location, the detection of a certain temperature reading, or the detection of motion at a certain location. An event can also be a control command from a web application on a mobile device, for example, to turn up the temperature on a thermostat or to turn on a light. The control command can also be received from web interfaces, such as from a laptop computer, or from other web services. Finally, an event can be a timer where an event is generated when the predetermined time set on the timer expires.

In embodiments of the present invention, an App includes a list of subscriptions to events, typically associated with devices, and a definition of event handlers to process those events, typically by taking action such as issuing commands. In some embodiments, an App may include a definition of preferences or user settings to allow a user to configure the App to operate on certain devices desired by the user. An App may further include event handlers for performing installation and update of the App. In one example, an App may subscribe to one or more events and generate responses based on the subscribed events where the responses may be an action or another event. In the simplest case, an App receives an event as an input and generates an action or raises other events as an output. In one embodiment, an event handler is the software code that describes the input event and the action to be taken or the output event to be raised.

In embodiments of the present application, an automation application implements one or more of the following functions. An App can subscribe to and receive events from devices, events from mobile devices, events from web services, or events from timers. An App can handle and process events. An App can define actions to be taken. In some embodiment, an App can raise events. An App can issue commands and set attributes on devices. For example, an App can make a web service call to an external data network. An App can access presence information, location, group and device information. An App can persist information in the database that is available across instantiations of the application. It is instructive to note that automation applications in system 100 are event driven, that is, they are not always running but are only invoked when a specified event occurs. It is instructive to note that an App is merely a collection of event handlers or a container of event handlers and that an App is installed in system 100 by installing the event handlers defined in the App. Once the App is installed, it is the individual event handlers that are executed in response to events and the App itself becomes a shell for identifying event handlers that belong to the same App. In the present description, references to "execution of the App" refers to the execution of (or invoking) the event handlers defined in the App. Thus, execution of an App refers to execution of the event handers associated with the App.

In embodiments of the present invention, system 100 realizes a distributed control scheme where some event handlers are executed on central server 102 while other event handlers are executed on hub 104. By distributing the execution of event handlers between the central server and the hub, system 100 can be made more responsive to events in the system. Furthermore, better resource utilization is achieved by distributing the processing load over different processors in system 100.

In some embodiments, for handling execution of Apps (or its associated event handlers) on the central server, central server 102 includes the application execution module 120. The application execution module 120 receives events and an application identifier (App ID) of an automation application to be executed from the event processing and routing module 118. The application execution module 120 loads the App from the database 124, or from a cache memory, and determines which event handler needs to be invoked and invokes the event handler. The application execution module 120 also collects all of the information required by the event handler associated with the App and provides the information to the event handler. The application execution module 120 may further monitor the execution of the App and report execution information in the data base. The application execution module 120 may further send out-bound events generated by the event handler back to the event processing and routing module 118. In some embodiments, execution of Apps results in generation of commands for devices which are sent to the event processing and routing module 118 to be transmitted to the hub 104 to cause actions to be taken on one or more devices 108. In some embodiments, the commands may be in the form of "event wirings," as will be explained in more detail below.

As thus configured, system 100 has stored there on one or more automation applications (Apps) and the automation applications are made available to users through the mobile application or web interface. The users, making use of one or more automation applications, operate one or more of devices 108 remotely based on specified events. For example, a user may select an automation application (e.g. Light.On) which detects motion at a motion sensor device and as a result of the detected motion, actuates a light switch to turn on a light. The detected motion constitutes an event while the actuation of the light switch constitutes an action. In another example, a user may select an automation application (e.g. Arrive.Home) which detects the opening of a door through a contact sensor and as a result of the detected state of the door, generates a web service call to check the weather or send a SMS message to a given mobile telephone number. The detected opening of the door constitutes an event while the web service call or SMS message constitutes another event raised by the App. By selecting the desired App, a user may configure one or more devices or appliances in his environment to respond to specified events.

In embodiments of the present invention, system 100 realizes a distributed control scheme where some events are serviced by Apps (or the associated event handlers) being executed on central server 102 while other events are serviced by Apps (or the associated event handlers) being executed on hub 104. The distributed control scheme ensures optimal configuration of an automation application at run-time where event handlers are executed efficiently, either on central server 102 or on hub 104. In some embodiments, central server 102 applies control policies to determine the best deployment strategy for executing the App. Various control polices can be applied to distribute the event handlers. In one embodiment, an event handler is configured to run on a hub that is located in closest proximity to the device. In another embodiment, when an event handler includes actions to raise events involving web service calls, the event handler is run at the central server. Other scenarios will be described in more detail below. In one embodiment, determination of distributing event handlers to the central server or to the hub is made when the App is installed by the user, as will be explained in more detail below.

As described above, an automation application or an App receives an event as an input and generates an action or raise other events as an output. An App is a collection of event handlers where an event handler is the software code that describes the input event and the action to be taken or an output event to be raised. In some embodiments, an event handler is compiled into Java bytecode and sits on the Java runtime environment (JRE). Such an event handler can be executed by the central server 102 or by a hub supporting the Java runtime environment.

In some system configuration, a hub may be configured without the ability to execute applications locally (such as executing applications using the Java Runtime environment). In embodiments of the present invention, central server 102 generates "event wiring" from an event handler and forwards the event wiring to the hub, or installs the event wiring at the hub, for execution. In embodiments of the present invention, an event handler is compiled into machine code as the "event wiring" to run on the hub. In one embodiment, the event wiring consists of JSON or xml data. In the present description, an event wiring defines the direct connection (or "wiring") of an event on a first device to a specific action on a second device, which can be the same device or a different device). While event handers may incorporate logical operations in the software codes, event wiring does not involve any logical operations. In event wiring, there is no programmable logic between the event and the action and the event directly causes the action. For example, an event wiring is used when a specific event on a specific device, such as a motion detected event on a motion detector, always results in the same response, such as turn on a light. Event wirings are commands send down to be stored on the hub for execution and do not have to rely on further communication with the central server 102 for execution.

In embodiments of the present invention, an automation application may include preferences to allow users to select a specific device or a group of devices to use with the application. The App may specify the device type and capabilities of the device required for the App. For example, the App may require a motion detector (device type) with night-vision capability. In another example, an App may require a switch that can provide an on-off function. The central server identifies all of the devices meeting the requirements of the App and provides a user interface to the user to select the preferred device as user configuration preferences.

Figures 2, 2A, 2B:
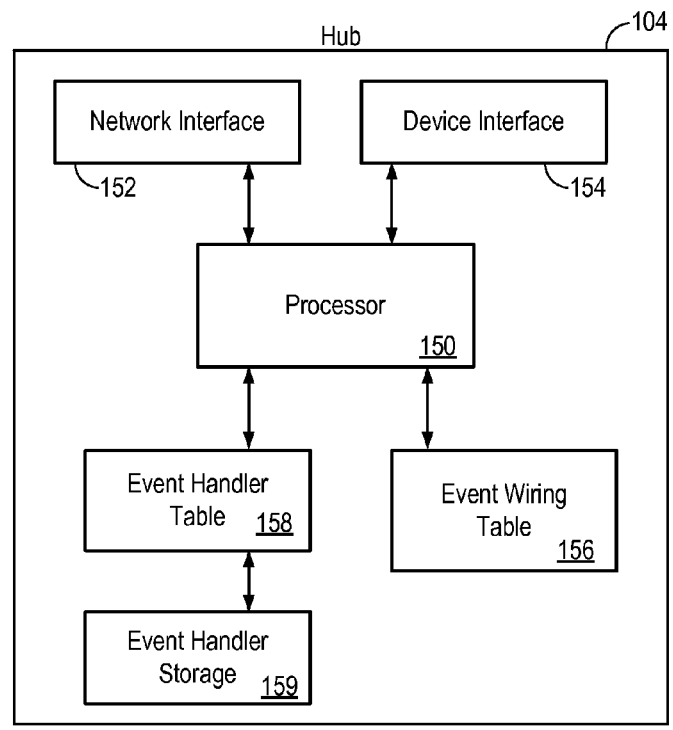
FIG. 2, which includes
FIGS. 2A and 2B, illustrates an example of a hub.

FIG. 2 illustrates an example of a hub. Referring to FIG. 2, a hub 104 includes a processor 150, a network interface 152 and a device interface 154 which implements one or more communication protocols for communicating with the data network and with one or more devices respectively. In one embodiment, the device interface may be implemented as radio frequency radios for communicating wirelessly with one or more devices in the environment. Hub 104 further includes one or more memories for storing event handlers and/or event wiring. In the present embodiment, hub 104 includes an event handler table 158 for storing a listing of event handlers installed on the hub to be executed on the hub. The hub 104 further includes an event handler storage for storing the software codes associated with each event handler listed in the event handler table. In the present embodiment, the hub 104 also includes an event wiring table 156 for storing event wiring data. Event wirings and event handlers are stored onto the memories in hub 104 when an App is installed by the user and the central server determines that the App or its associated event handlers should be deployed to the hub for execution at run-time.

In the embodiment shown in FIG. 2, the hub 104 includes both the event handler table and the event wiring table. Hub 104 can therefore support commands sent as event wirings and can support execution of event handlers. In other embodiments, the hub 104 can be configured to include either an event handler table or an event wiring table. In the case where the hub is provided with the capability to execute event handers, then the event wiring table is not needed and the hub may be configured to include only the event handler table 158 and the event handler storage 159. In the case where the hub does not support the programming language of event handlers, the hub 10 may be configured to include only the event wiring table 156. FIG. 2 is illustrative only and is not intended to be limiting.

An example of an event wiring table 156 is shown in FIG. 2A. In one embodiment, the event wiring table 156 is implemented as a look-up table. Event wiring table 156 associates an event identifier (event ID) to a source device ID, a target device ID and an action. In operation, when the hub 104 detects the occurrence of an event with a certain event ID from the associated source device ID, the hub 104 will take the associated action to the associated target device. In some cases, an event may be mapped to multiple entries in table 156. In that case, hub 104 executes the action defined for each event entry to each specified target device.

An example of an event handler table 158 is shown in FIG. 2B. In one embodiment, the event handler table 158 is implemented as a look-up table. When hub 104 has the capability to execute the software codes defined in the event handler, then the event handler can be installed on the hub to be executed on the hub. In particular, the event handler table 158 associates an event identifier (event ID) and a source device identifier (ID) with an event handler identifier (ID). In operation, when the hub 104 detects the occurrence of an event with a certain event ID on a source device with a certain source device ID, the hub 104 will retrieve the associated event handler ID. The event hander ID can then be used to retrieve the codes associated with the event hander ID. The processor 150 invokes the event handler, or executes the codes of the event handler to generate the action required. The processor 150 functions as the execution module of the event handlers that are stored in the hub to be executed in the hub. In some cases, an event may be mapped to multiple entries in table 158. In that case, hub 104 executes the event handler defined for each event entry.

Figure 3:
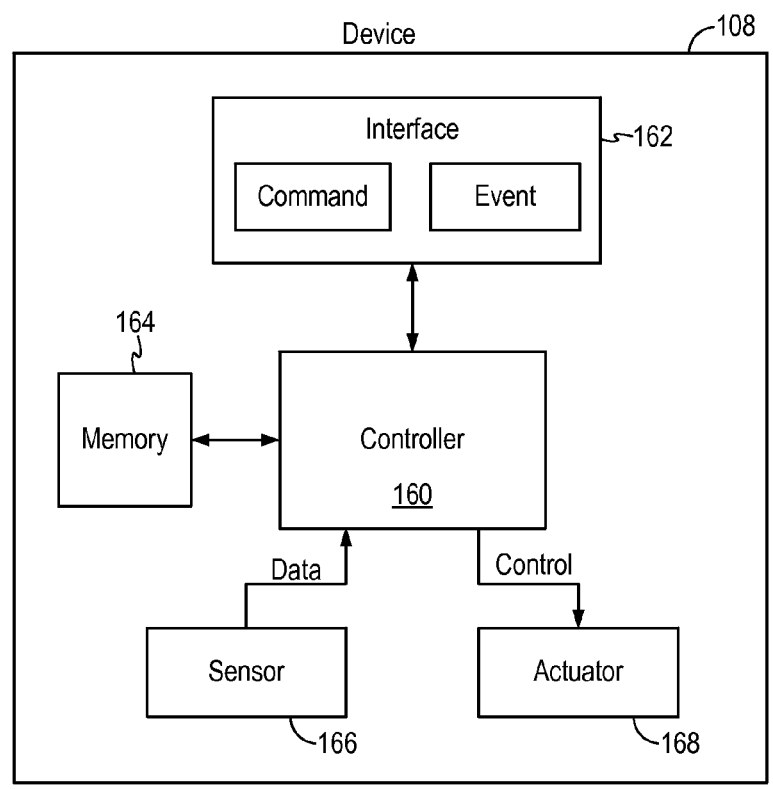
FIG. 3 illustrates an example of a device which may be installed in an environment to be monitored and controlled by the web-based device automation system.

FIG. 3 illustrates an example of a device which may be installed in an environment to be monitored and controlled by the web-based device automation system. Referring to FIG. 3, a device 108 includes a controller 160 communicating with a communication interface 162. The communication interface 162 may include a command interface and an event interface as logical components of the interface. The command interface receives commands for actions to be taken on the device from the hub. The event interface reports status or event data to the hub. The communication interface 162 implements wired or wireless communication protocols for communicating with the hub. Device 108 may include a local memory 164 for storing status and event data. Memory 164 is optional and may be omitted in other embodiments of the device. Controller 160 may include embedded memory sufficient to store the status and event data for the device.

Device 108 may be applied in many applications in an environment. Device 108 may be configured as a sensing device for sensing certain environmental data or status condition data, such as temperature, humidity, pressure and open and close conditions. Device 108 may also be configured as an actuating device for controlling an object. For example, device 108 may be an actuator for activating a door lock, or a light switch, or a thermostat. In some cases, device 108 may be both a sensing device and an actuating device. In the present illustration, device 108 includes a sensor 166 or an interface to a sensor and further includes an actuator 168 or an interface to an actuator. Sensor 166 provides data to controller 160 while actuator 168 receives control signals from the controller 160. The configuration for device 108 shown in FIG. 3 is illustrative only. In embodiments of the present invention, a device 108 may include only the sensor or only the actuator or both depending on the application of device 108.

In an automatic application in system 100, a device is associated with a device type and is defined by its capabilities, its attributes and the events it can generate. For example, an on-off switch device has the capabilities of turning on and turning off, has an attribute of a current state being on or off, and has an On event and an Off event. The controller 160 in device 108 accepts commands that may change the attributes or doing something physically in device 108. The device may further report events, such as the current state of the device or the current state of the attributes of the device. For example, a device may be a door and the attributes may be the position and the current state of the attribute may be open, close or locked.

In embodiments of the present invention, a composite device type can be formed by aggregating multiple physical devices into one logical device. An automation application can be written using the composite device type so that the device is treated as a single logical device, without regard to how many separate physical devices there may be. For example, a virtual device type can be a garage door opener which consists of an accelerometer and a relay as the separate physical devices. An automation application may be created to respond to events from the garage door opener and issues actions and commands to the garage door opener. With the use of the composite device type, the fact that the garage door opener includes separate lower level devices is irrelevant to the user. The central server 102 of system 100 takes care of the installation and execution of the automation application for interacting with a device having the composite device type.

FIG. 4, which includes FIGS. 4A and 4B, illustrate examples of an event handler and an event handler generating event wiring. In general, an App defines the device types that are called out and the capabilities that are required for the App. In FIG. 4A, an event handler "onDoorOpen" receives as input an Event and Preferences specifying one or more source devices. If the Event occurred on a source device defined in the Preferences, then the event handler generates an action to turn on a light or multiple lights as the target devices. The target devices are selected based on user preferences.

In FIG. 4B, an event handler "onMotionDetected" receives as input an Event and Preferences specifying one or more source devices. Specifically, the event handler onMotionDetected generates event wiring that may be stored in a hub for execution. The event handler first determines if the hard wiring has already taken place. For example, if the action is to turn on a light, the event handler first checks if the light is already turned on. If not, a new wiring is created where in response to the event, the light specified by user preference is to be turned on.

Figure 5:
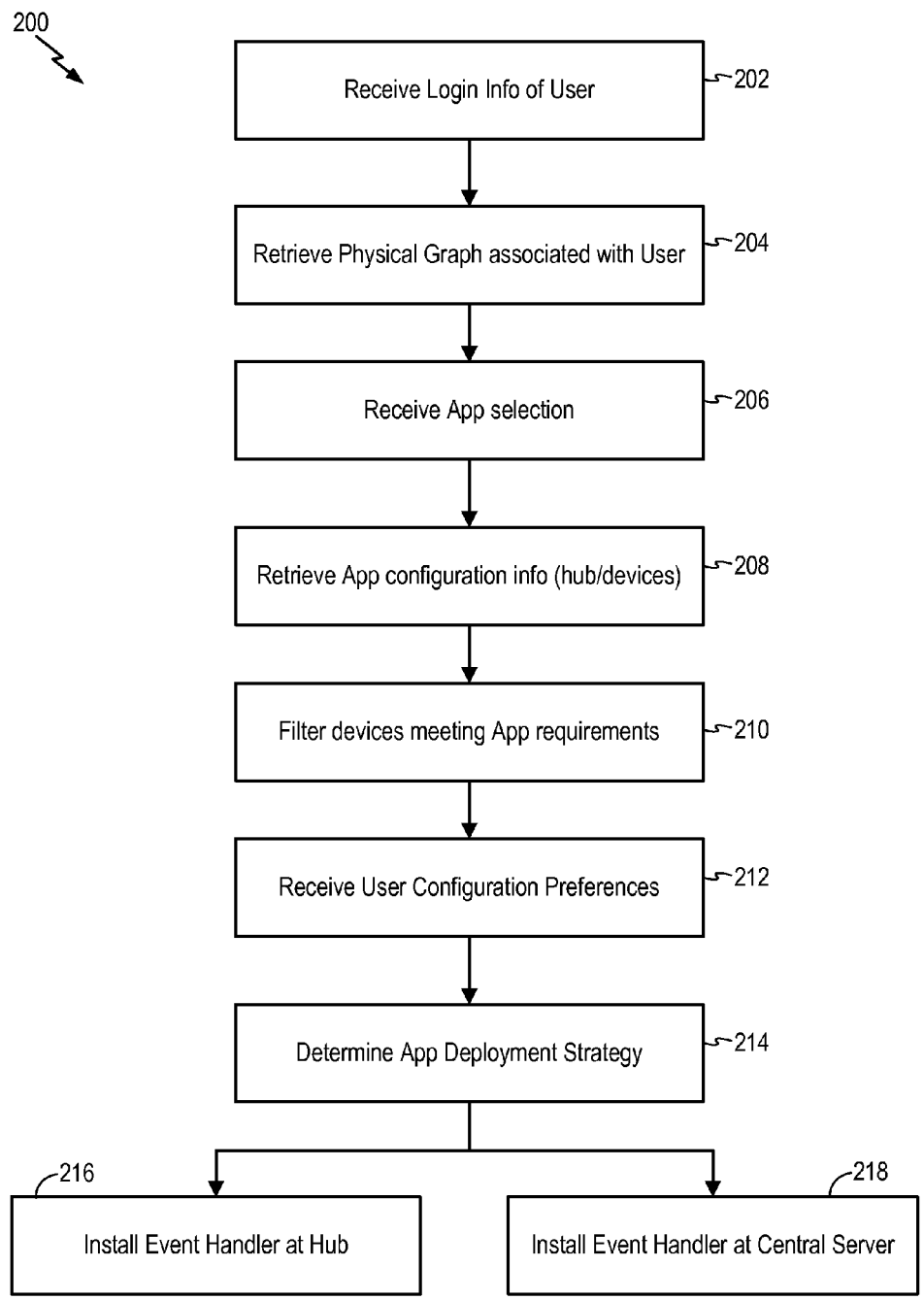
FIG. 5 is a flow chart illustrating the process for configuring and installing an automation application in the web-based device automation system in embodiments of the present invention.

FIG. 5 is a flow chart illustrating the process for configuring and installing an automation application in the web-based device automation system in embodiments of the present invention. The App configuration and installation process 200 in FIG. 5 can be used in conjunction with system 100 in FIG. 1. Referring to FIG. 5, a user having a hub 104 and one or more devices 108 installed in an environment and wishing to access services provided by the web-based device automation system 100 initiates a login to the central server 102. Central server 102 receives the login information for the user (202). Central server 102 then retrieves the physical graph associated with the user's environment (204). For example, the physical graph for the user's environment may be established when the user sets up the hub 104 and one or more devices 108 are joined or paired with the hub.

Then, the central server 102 receives an App selection (206). For example, the user may select the onDoorOpen App in FIG. 4A. In one embodiment, the central server 102 presents a selection of automation applications to the user and the user may select an App to handle certain desirable events. From the selected App, the central server 102 retrieves the App configuration information required for that App (208). In some cases, the App does not involve any user experience and the process 200 may proceed to 214. In other cases, the App requires further user input and presents a user interface to the user to select preferences for configuring the App for installation. The user interface may be presented through a mobile application on a mobile device or through a web browser in a computer device, such as a laptop. For example, the onDoorOpen App is configured to operate in response to an event on a source device (contact sensor) and turn on a target device (light) where the specific source device and target device can be specified by user preferences. In the user's physical graph, there may be more than one contact sensor and more than one lighting device. The onDoorOpen App therefore collects the configuration information needed to execute the App, including the device types that are called out by the App and the required capabilities for the devices called out by the App.

Central server 102 filters the devices in the user's physical graph based on the requirements or specification of the App (210). Of all the devices in the user's physical graph, central server 102 selects those that meet the device type and the capabilities called out by the App. The list of possible source devices and target devices is then provided to the user through a user interface where the user may make selections. The central server 102 then receives user configuration preferences (212). The central server 102 then determines the optimal deployment strategy for the App (214). In some cases, the App is more efficiently executed at the central server. In that case, the App (or the associated event hander) is installed at the central server 102 (218) and the central server 102 issues commands to the hub to execute the actions described in the App. In other cases, the App is more efficiently executed at the hub 104 in the user's environment. In that case, the central server 102 installs the App (or its associated event handler) at the hub (216). In one embodiment, the central server 102 generates event wiring from the event handler and sends the event wiring down to the hub to be installed at the hub. The hub stores the event wiring in its local memory and executes the actions described in the event wiring in response to the subscribed event. Alternately, the central server 102 may send the event handler associated with the App down to the hub when the hub is capable of executing software codes and the event handlers are stored in the hub and executed by the hub.

Central server 102 applies various policies to determine the optimal deployment strategy for an App. In particular, the deployment of the App is determined when the App is installed so that the deployment strategy is made pertaining to each user's specific configuration of devices and hubs. In one example, in a user environment with two or more hubs, the central server may install an App to be executed on one of the hubs if all the devices called out by that App is associated with that one hub. However, if the devices are connected to different hubs, then the App will be executed from the central server.

In another example, in a user environment where a hub is provided with the capability to execute event handlers, that is, to process and execute the programming language of event handlers, then the central server may install an App to be executed on the hub. In yet another example, the central server examines actions called out by the App. When the action called out by the App results in actions taken at the central server, such as a web service call, then the App should be executed from the central server rather than at the hub.

It is instructive to note that in system 100, automation applications are written without knowledge or without taking in consideration how the automation applications or the associated event handlers will be distributed at deployment. In particular, an automation application may be deployed differently in different environments. The deployment characteristics of an automation application is a function of the configuration of hubs (if any) and devices in a user's environment, as described by the physical graph associated with the user.

Figure 6:
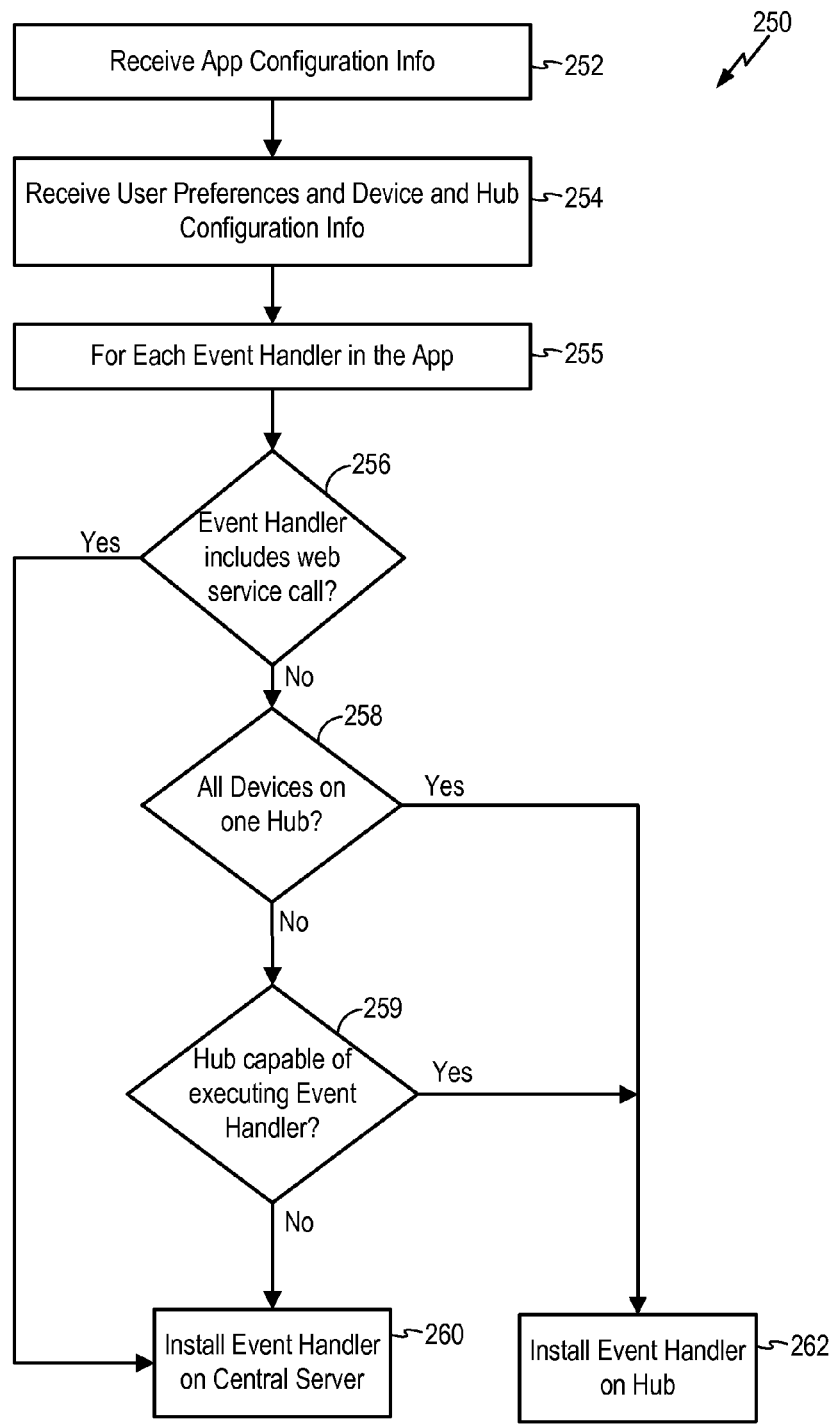
FIG. 6 is a flow chart illustrating the process for automatically determining application deployment strategy in the web-based device automation system in one embodiment of the present invention.

FIG. 6 is a flow chart illustrating the process for automatically determining application deployment strategy in the web-based device automation system in one embodiment of the present invention. Referring to FIG. 6, process 250 starts when central server 102 receives the configuration information for an App (252) and further receives user preferences and the configuration information (or the physical graph) for devices and hubs associated with the user's environment (254). Based on this information, central server 102 determines if the App should be installed on the central server or on a hub in the user's environment. In the present embodiment, for each event handler in the App (255), the process 250 first determines if the App includes any web services call (256). If yes, then the App will be installed on the central server for execution on the central server (260). If no, then process 250 continues to determine if all the devices needed for execution of the App are all associated with one hub (258). If the devices are all associated with one hub, then the App can be installed on the hub for execution on the hub (262). If not, process 250 continues to determine if the hub is capable of executing event handlers (259). If yes, then the App can be installed on the hub for execution on the hub (262). If not, the App will have to be installed on the central server for execution on the central server (260). In some cases, the process 250 also determines if an event handler generates event wiring. If the hub supports event wiring, then the App is sent down to the hub to be installed on the hub as event wiring.

In embodiments of the present invention, the event handler is the boundary for the automatic deployment analysis. That is, an event handler is the boundary where the central server will analyze the actions in the event handler and makes an automatic determination where the event handler can run. The determination is made at the App installation time when the specific user configuration information can be obtained to determine how the event handler should be executed. Thus, an App can be structured so that execution of the event handlers is distributed optimally between the central server or the hub. For example, an App may be created to detect a door opening event and turn on a light and make a web service call to check the weather. When the App is structured as such, the App will be installed to run from the central server as the App requires making a web service call. However, the App may be structured with separate event handlers so that some of the actions can take place on the hub instead of the central server. For example, the App can be structure to include a first event handler to detect a door opening event and turn on a light and then raise a second event handler. The second event handler makes a web service call to check the weather. In this case, the central server will determine that the first event handler can be installed at the hub while the second event handler is installed at the central server. In this manner, optimal deployment of event handlers is realized.

Figure 7:
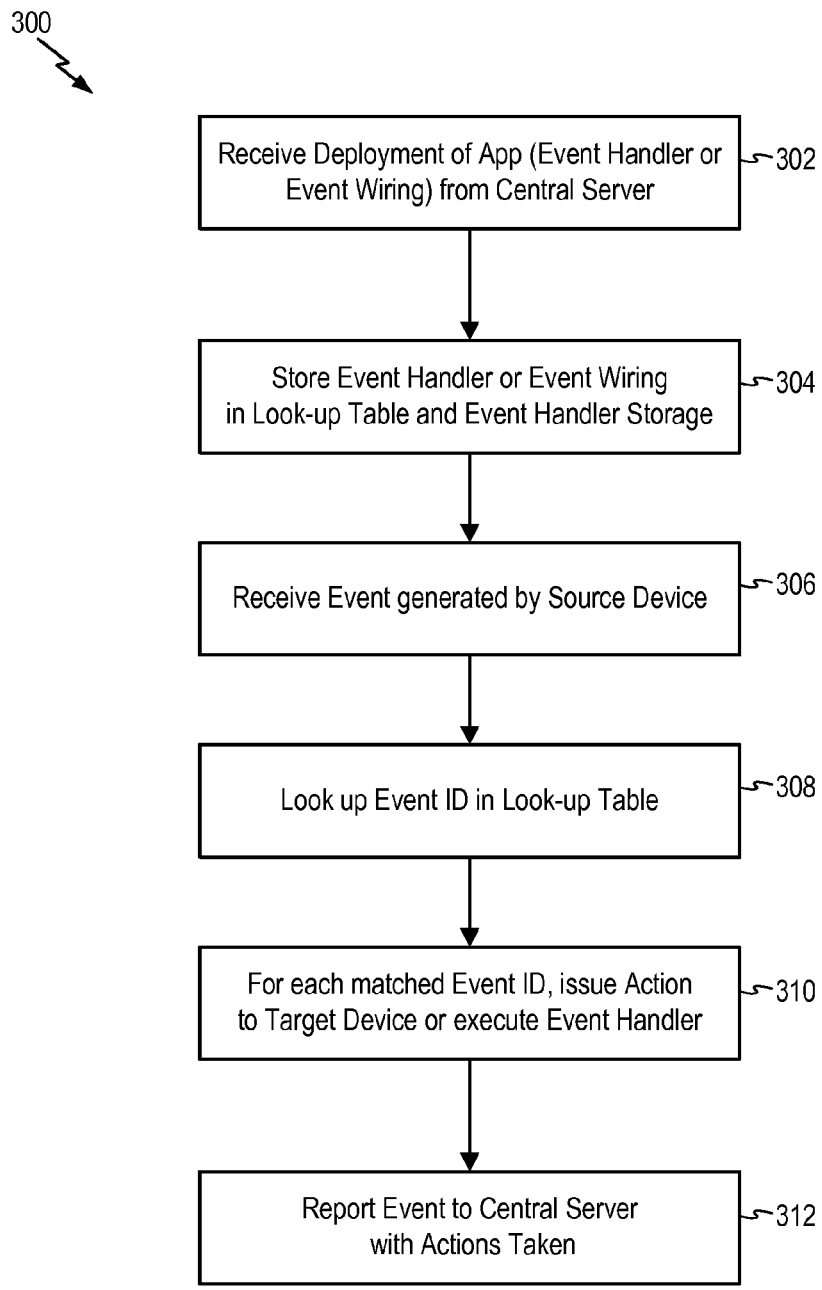
FIG. 7 is a flow chart illustrating the application execution process at a hub in the web-based device automation system in one embodiment of the present invention.

FIG. 7 is a flow chart illustrating the application execution process at a hub in the web-based device automation system in one embodiment of the present invention. Referring to FIG. 7, process 300 operates on a hub installed in a user's environment. The hub receives deployment of event handlers or event wirings from the central server (302). The event handlers or event wirings are stored in memories, such as look-up tables, in the hub (304). Then, an event generated by a source device is detected by the hub (306), such as when a device reports an event to the hub or when the central server reports an event to the hub. The hub look up the event ID and the source device identifier in the event wiring table or look up the event ID in the event handler table (308).

For each matched event ID in the event wiring table, the hub issues the action to the target device (310). For each matched event ID in the event handler table, the hub executes the codes and takes the action specified by the codes (310). In some embodiments, the hub may then report the event to the central server with the actions that were taken (312).

In embodiments of the present invention, events received at the hub are sent up to the central server to the event processing and routing module. The event processing and routing module processes the events to determine if event handlers that are installed on the central server may subscribe to the event. An event handler may be invoked and executed at the Application Execution module when a subscribed event is received. The execution of App or event handlers at the central server is described above with reference to FIG. 1.

Figure 8:
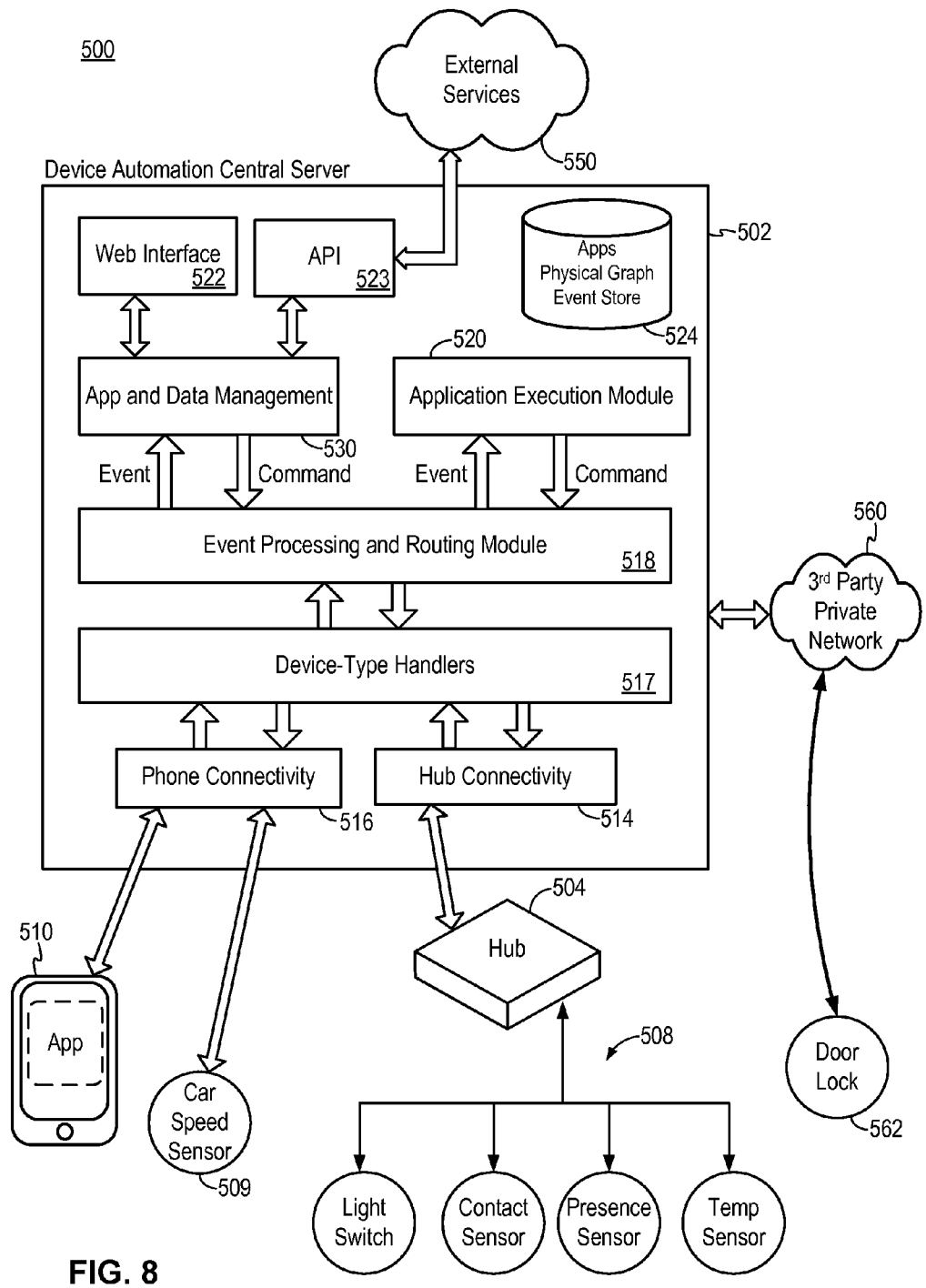
FIG. 8 is a block diagram illustrating a web-based device automation system in alternate embodiments of the present invention.

FIG. 8 is a block diagram illustrating a web-based device automation system in alternate embodiments of the present invention. Referring to FIG. 8, a web-based device automation system 500 ("system 500") includes a web-based device automation central server 502 ("central server 502") communicating with a hub 504 over a data network (not shown), such as the Internet or an intranet. The hub 504 is installed in an environment and is in communication with one or more devices 508. As thus configured, central server 502 implements the processing and control for remotely monitoring and controlling devices 508 over the data network.

In the present embodiment, central server 502 further supports direct communication with devices, such as device 509. That is, central server 502 may communicate with devices directly without going through a hub. For example, a device 509 may communicate with central server 502 through a cellular network (not shown) and using the phone connectivity interface 516. In one example, the device 509 is a sensor module installed in a car for monitoring the traveling speed of the car. Device 509 supports cellular communication and generates status data (car speed) which are reported back to the central server 502 as events. In other examples, device 509 can be a location determination device or an outdoor temperature sensor.

In the present embodiment, central server 502 further supports network-to-network, or cloud-to-cloud, communication. In one example, a device 562 installed in the same environment as other devices 508 may be configured to communicate only with a third party private data network, such as a data network 560 associated with the manufacturer of the device 562. For example, manufacturers of remote control door locks typically required the lock to communicate only with the manufacturers' own data network in order to ensure security. In embodiments of the present invention, central sever 502 supports communication with third party private data networks, such as network 560, to enable a user to control and operate device 562 seamlessly through central server 502 and using the automation applications that are part of system 500.

FIG. 8 further illustrates an embodiment of central server 502. The example shown is a representation of logical components that may be included in central server 502, in some embodiments. In the embodiment shown in FIG. 8, central server 502 includes a hub connectivity interface 514 configured to communicate with hub 504 over a data network (not shown) and a phone connectivity interface 516 configured to communicate with mobile devices, such as smartphone 510, over a cellular network (not shown). Hub connectivity interface 514 implements the necessary communication protocols to communicate with the hub 504 over the data network and phone connectivity interface 516 implements the necessary communication protocols to communicate with mobile devices and devices 509 over a cellular network. In one embodiment, hub connectivity interface 514 and phone connectivity interface 516 maintain a persistent connection to the data network and to one or more cellular network to enable continuous connection to the hubs in the system and to one or more devices and mobile devices accessing the system.

Central server 502 includes a device-type handler module 517 and an event processing and routing module 518. Device-type handler module 517 implements device-type handlers that are an abstraction of devices from their distinct capabilities. More specifically, device-type handlers enable automation applications to be written using generic or normalized language for commands and status with respect to devices and the device-type handlers in module 517 perform the translation of the normalized language to device-specific language required to communicate with the physical devices. The operation of the device-type handler module 517 in central server 502 will be explained in more detail below. In brief, the device-type handler module 517 receives device-specific events and status and generates normalized events and status for the event processing and routing module 518. The device-type handler module 517 also receives normalized commands from the event processing and routing module 518 and generates device-specific commands to be sent to the devices 508 or 509.

Event processing and routing module 518 operates in the same manner as described above to process and route events within system 500. The functions of the event processing and routing module 518 includes receiving and processing event data received from the hub connectivity interface 514 and phone connectivity interface 516 and determining how events should be routed in the system 500. Central server 502 further includes an application execution module 520 configured to handle execution of automation applications or Apps on the central server. The central server 502 includes an App and Data management module 530 for supporting data transfer with a web interface 522 and an API 523. For example, web interface 522 supports communication with external web services. Alternately, API 523 can be used to communicate with external services 550, such as external web services. API 523 can also be used to communicate with third party private data network 560. Finally, central server 502 includes a database 524 for storing automation applications, user physical graphs, event store and other data. In physical implementations, the central server 502 may include one or more processors performing the functions of the logical blocks shown in FIG. 8.

In system 500, device-type handlers are virtual representations of devices in the environment that enable the separation of devices with their capabilities from automation applications that are used to control or monitor the devices. In this manner, an automation application is not necessarily tightly coupled to a specific device but rather can be used on a class of devices meeting the requirements specified in the App.

In the present description, a device is associated with a device type and a device type is defined by its capabilities, its attributes and the events it can generate. For example, a device type "switch" describes devices that have the On and Off capabilities. Switches many different physical configuration and may employ different wireless communication protocols. A simple light switch or a multi-sensor can both belong to the device type "switch." A multi-sensor can belong to the device type "switch" or the device type "sensor" describing sensing capabilities. Through the use of device type and device-type handlers, an automation application can be written for a certain device type instead of a specific device. That is, an automation application can be written without regard to the actual configuration or implementation of the physical device. The exact physical configuration of the device is not critical to the App but rather all the App looks for is a device that can perform certain functions or a device that has certain attributes. With the use of device types and device-type handlers, an App can be used on any devices belonging to the device type (e.g. "switch") without knowing the exact nature of the device.

In another example, a device type can be defined by its capabilities and attributes. For example, a device type "ACME wireless door lock version 4" describes a fourth generation door lock device from the manufacturer ACME that has a locking and unlocking capabilities and wireless communication ability.

In embodiments of the present invention, device-type handlers are software components that act as a translator between a device and an automation application that makes use of the device. In system 500, device-type handlers are the bridge between generic capabilities at the automation application level and the device-specific (or protocol-specific) interface actually used to communicate with the device. Device-type handlers enable automation applications to be developed without knowing the specific details of the physical devices. Device-type handlers enable automation applications to be written using generic or normalized commands so that an automation application can be applied to any devices having the capabilities of a specific device type, including devices to be developed in the future.

In embodiments of the present invention, device-type handlers are installed at the central server 502 in device-type handler module 517. Furthermore, in some embodiments, device-type handlers may also be installed at the hub 504 when the hub is used to execute event handlers. Device-type handlers can be installed at the hub in one of several ways. In some embodiments, when a user sets up a hub in his or her environment, the hub, as part of the set up procedure, is placed in the "join" mode to join or pair with devices that are within its communication range. During the pairing process, the hub discovers the device type of the device using identifying information associated with the device, referred to as "device fingerprints." Device fingerprints can include information such as the manufacturer identification, the product identification, the device identification and other unique identifier for the device. The hub may further discover the capabilities of the device, including the communication protocol used by the device. Once a device is paired with the hub, the hub sends information associated with the device to the central server and the device is added to the user's physical graph.

Based on the device fingerprint information, the central server determines the device-type handler to be used with the device. If a specific device-type handler cannot be find, then a generic device-type handler can be used. In a first embodiment, the central server deploys to the hub all device-type handlers for devices that have paired with the hub. The hub stores the device-type handlers for future use. The central server may also dynamically download updates of the device-type handlers that have been deployed to the hub. In a second embodiment, the central server deploys device-type handlers to the hub only when an App is to be installed on the hub to be executed on the hub. In that case, device-type handlers are deployed to the hub in an ondemand basis. In either case, the hub is provided with the device-type handlers that it needs to execute Apps or device handlers on the hub.

Figure 9:
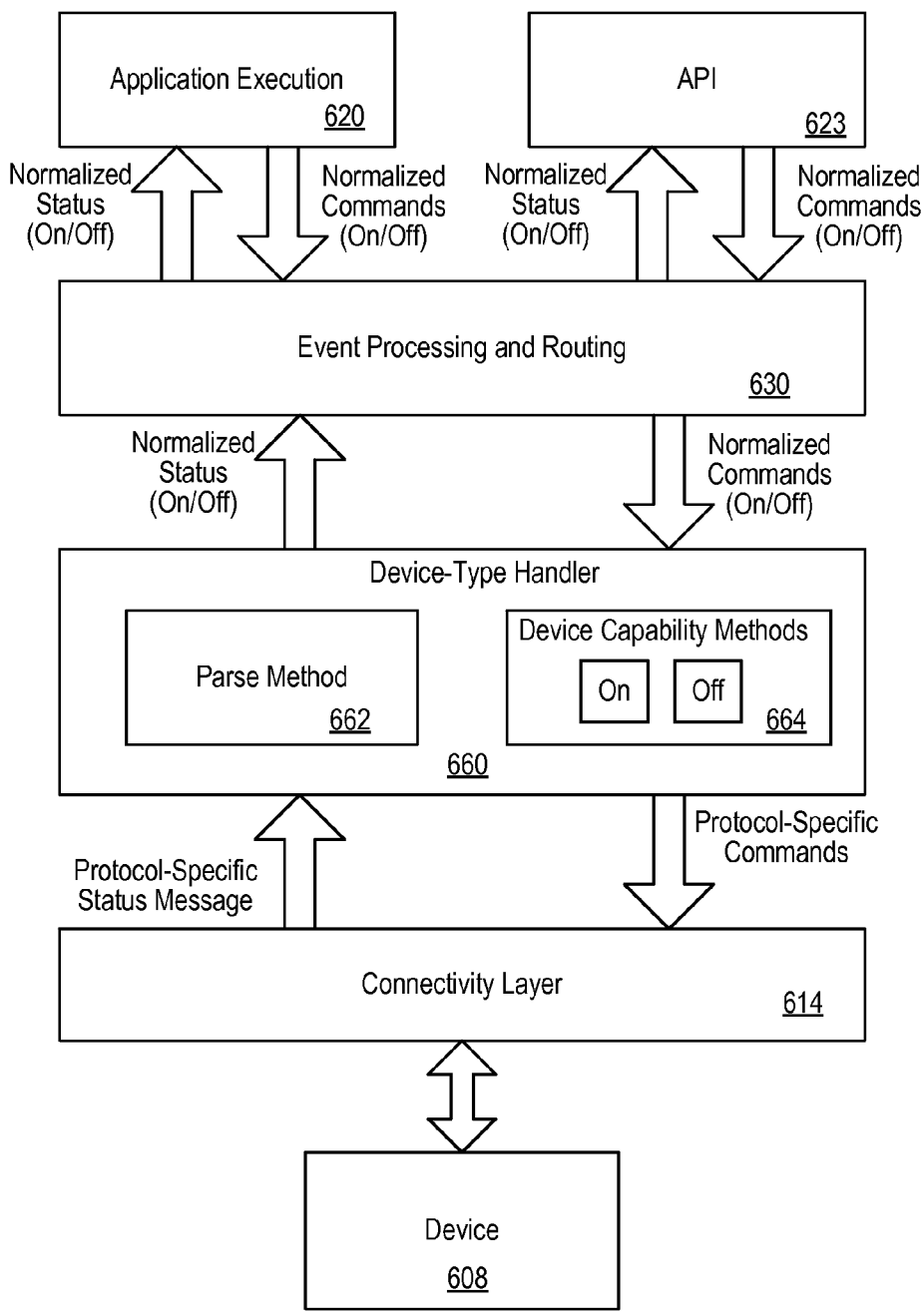
FIG. 9 is a logical block diagram illustrating the operation of the device-type handler in the execution of an automation application in examples of the present invention.

During execution of event handlers, whether at the central server or at the hub, the device-type handlers operate to translate communications between the device and the automation applications from device-specific (or protocol-specific) communication to normalized communication and vice versa. FIG. 9 is a logical block diagram illustrating the operation of the device-type handler in the execution of an automation application in examples of the present invention. Referring to FIG. 9, a device-type handler 660 is provided for a device 608 implementing a switch capability. A device with a switch capability has the ability to turn on or off. The main function of the device-type handler 660 is to parse incoming protocol-specific status messages from the device 608, received through the connectivity layer 614, and turn these protocol-specific status messages into normalized events or status. In the present description, protocol-specific status messages refer to messages that are transmitted in the format of the communication protocol used by the device. For example, the device may employ protocols such as Zigbee or Z-Wave. The device-type handler 660 is also responsible for accepting normalized commands (such as 'on' and 'off') and turning those into the protocol-specific commands that can be sent to the device to effect the desired action.

More specifically, the device 608 may report a status to the central server or the hub. The connectivity layer 614 (of the central server or the hub) receives the protocol-specific status message from the device 608 and forwards the message to the device-type handler 660. The device-type handler 660 implements a parse method 662 to parse the incoming protocol-specific status message and to generate a normalized event (e.g. "On" event or "Off" event). The normalized event can then be sent to the event processing and routing module 630 to be processed. The event processing and routing module 630 determines the event handler that subscribes to the event and forwards the event with the event handler to the application execution module 620. The normalized event may also be made available to external services, such as through an API 623.

In one example, assume device 608 is a Z-Wave compatible on-off switch. The protocol-specific status messages to report an "on" state or an "off" state are as follows. The normalized event generated by the device-type handler is simply an "On" or "Off" event.

| Device Status | Protocol-specific Status Message | Normalized Event |
| --- | --- | --- |
| On | command: 2003, payload: FF | On |
| Off | command: 2003, payload: 00 | Off |

When the execution of the event handler at the application execution module 620 results in generation of commands for actions to be taken on the device 608 (or another device), the event handler generates a normalized command which is sent to the event processing and routing module 630. Normalized commands may also be received from the API 623. The event processing and routing module 630 forwards the normalized command intended for device 608 to device-type handler 660. The device-type handler 660 implements device capability methods 664 to translate the normalized command (On or Off) to a protocol-specific command. The protocol-specific command is then forwarded to device 608 through the connectivity layer 614.

Following the above example, assume again that device 608 is a Z-Wave compatible on-off switch. The normalized commands and the protocol-specific commands are as follows:

| Device Command | Protocol-specific Command Message |
| --- | --- |
| On | 2001FF |
| Off | 200100 |

FIG. 9 is provided to illustrate the operation of the device-type handler 660 in generating normalized event and generating device-specific (or protocol-specific) commands. FIG. 9 illustrates events being received from device 608 and commands being generated for the same device 608. FIG. 9 is illustrative only and does not necessarily illustrate the actual operation of the device automation system in the present invention. For example, in normal operation of the device automation system, status messages are received from a source device and commands are generated for a target device and the source device and the target device may not be the same device. The use of device 608 in FIG. 9 is symbolic only.

FIG. 10, which includes FIGS. 10(a) and 10(b), illustrates an example of a hub incorporating device-type handlers. Referring to FIG. 10(a), a hub 704 includes a processor 750, a network interface 152 and a device interface 154 which implements one or more communication protocols for communicating with the data network and with one or more devices respectively. Hub 704 further includes an event handler table 158 for storing a listing of event handlers installed on the hub to be executed on the hub. The hub 704 further includes an event handler storage for storing the software codes associated with each event handler listed in the event handler table. In the present embodiment, the hub 704 further includes a device-type handler storage 760 for storing one or more device-type handlers for use by processor 750 in processing incoming status messages and generating outgoing commands.

FIG. 10(b) illustrates the logical block diagram of the hub 704. The logical blocks of hub processor 704 is similar to the logical blocks of the central server. The hub 704 includes a device interface 772 for communicating with devices. Messages received from devices are sent to the device-type handler 774 to be translated. The normalized messages or events are then sent to the event processing and routing module 776 to be processed. The event processing and routing module 776 looks for subscription of the event and invokes the event handler that subscribes to the event. The event handler execution module 778 supports the execution of event handlers in response to the received event. Normalized commands generated by the event handler execution module 778 flows down the logical blocks to the event processing and routing module 776 and then to the device-type handler 774 to be translated into protocol-specific commands. The protocol-specific commands are then provided to the device interface 772 to be forwarded to the device.

It is instructive to note that during the operation of the automation system 500, status messages generated by devices and received at the hub are normalized by the local device-type handler into normalized events and these events can be operated on at the hub but are also sent up to the central server. Because the event has already been normalized, the central server does not need to apply the device-type handler to the received event again and may process and route the event and store the events in the event store database. In other embodiments, the central server may receive status messages directly from devices. In that case, the protocol-specific status messages are provided to the device-type handler module in the central server to be translated into normalized events.

Similarly, when the application execution module at the central server generates commands for a device, the commands will be translated into protocol-specific commands by the device-type handler at the central server before the commands are sent down to the hub or directly to the device. The hub, upon receiving the protocol-specific commands, forwards the commands to the device and does not need to invoke the device-type handler again.

Figure 11:
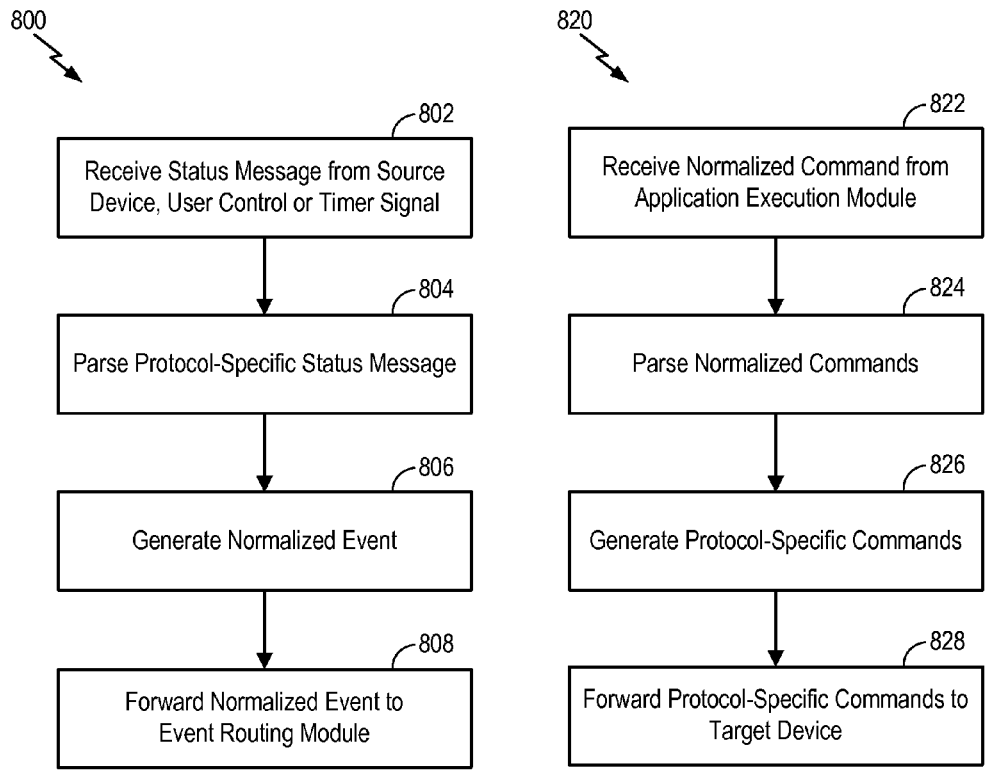
FIG. 11, which includes FIG. 11(a) and FIG. 11(b), contains flow charts illustrating device-type handler methods in the central server or the hub of the automation system in embodiments of the present invention.

FIG. 11, which includes FIG. 11(a) and FIG. 11(b), contains flow charts illustrating device-type handler methods in the central server or the hub of the automation system in embodiments of the present invention. Referring to FIG. 11(a), a method 800 illustrates the processing of incoming status messages. At 802, a status message is received from a source device, from user control, or from a timer. At 804, method 800 parses the protocol-specific status message. At 806, method 800 generates normalized event. At 808, method 800 forwards the normalized event to the event processing and routing module.

Referring to FIG. 11(b), a method 820 illustrates the processing of incoming normalized commands. At 822, method 820 receives normalized commands from the application execution module. At 824, method 820 parses the normalized commands. At 826, method 820 generates protocol-specific commands. At 828, the method 820 forwards the protocol-specific commands to the target device.

In the above-described embodiments, an event handler, in response to an event, may issue an action to a target device or the event handler may raise another event. The event being raised—referred to as a custom event—can be subscribed by other event handlers. Accordingly, the automation system of the present invention may use custom events as a means for event handler communications. When one event handler raises a custom event, that custom event can be treated as a message from one event handler to another event handler. In this manner, custom events become a convenient method in the automation system to relay messages from one event handler to another event handler.

Secured Device Access Method

According to another aspect of the present invention, a web-based device automation system implements secured device access where the configuration of an automation application for specific devices in a user's automation environment and the installation of the automation application define the security scope for the automation application. Once the automation application is configured and installed, the automation application is only allowed access to the authorized devices in the user's automation environment and the automation application may not access other devices in the user's environment that have not been authorized. The secured device access method of the present invention can be advantageously applied in an automation environment to establish the security boundary where an automation application is granted permission to control only authorized physical devices in the user's home or office or other types of premises.

In some embodiments, the configuration of the automation application defines the level of access and control the automation application has over the authorized devices. Once the automation application is installed with the specific configuration, the automation application is restricted to the authorized level of access and control for the authorized devices.

Referring back to FIG. 8, a user may use the web-based device automation system, such as system 500 in FIG. 8, to communicate with and control a variety of physical devices in a user's environment using a variety of connectivity and communication schemes. For example, the user may configure devices, such as devices 508, to communicate with the central server through a hub 504. The central server may then control the devices 508 by sending commands through the hub 504. In the present description, physical devices 508 are sometimes referred to as "hub connected devices."

In other examples, the user may also configure devices, such as device 509, to communicate directly with the central server 502, without going through a hub. In the present description, physical device 509 is sometimes referred to as "direct-cloud connected devices." Finally, the user may configure devices that are controlled by a third-party private network, such as device 562 through the third party private network 560. The central server 502 supports network-to-network or cloud-to-cloud communication with the third party private network 560 to enable the user to communicate and control device 562 seamlessly through the central server. In the present description, physical device 562 is sometimes referred to as "cloud-to-cloud connected devices." In the present description, hub connected devices, direct-cloud connected devices and cloud-to-cloud connected devices are sometimes collectively referred to as "connected physical devices" or "connected devices."

With a set of web-controlled physical devices thus connected, the user may select one or more automation application to control or access the connected physical devices. As these web-controlled physical devices are often installed in a user's private environment, such as the user's home or business, security becomes an important issue. In particular, the ability to control access to the connected physical devices installed in an environment is important to prevent unauthorized access to a user's physical devices. In embodiments of the present invention, a secured device access method is implemented in the web-based device automation system to control the access to connected physical devices in a user's environment.

Figure 12:
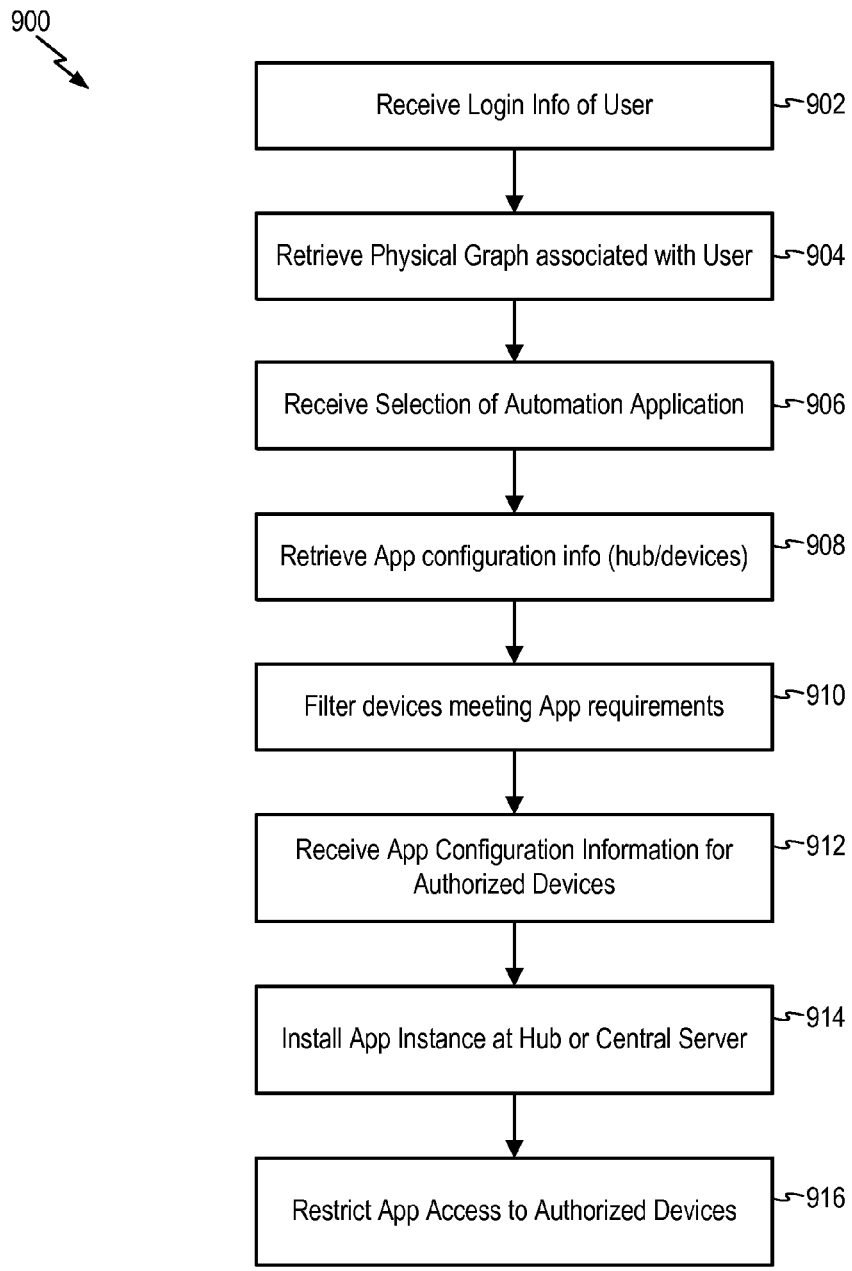
FIG. 12 is a flow chart illustrating a secured device access method which can be implemented in a web-based device automation system in embodiments of the present invention.

FIG. 12 is a flow chart illustrating a secured device access method which can be implemented in a web-based device automation system in embodiments of the present invention. The secured device access method 900 in FIG. 12 can be used in conjunction with system 100 in FIG. 1 or system 500 in FIG. 8. In the following description, the secured device access method 900 will be described with reference to system 500 of FIG. 8. Referring to FIG. 12, a user having one or more connected devices (such as devices 508, 509, 562) installed in an environment and wishing to access services provided by a web-based device automation system (such as system 500) initiates a login to the central server of the device automation system (such as central server 502). The secured device access method 900 receives the login information for the user (902). At the central server, the physical graph associated with the user's environment is retrieved (904). The physical graph for the user's environment contains the configuration of connected devices in the user's environment.

Then, the secured device access method 900 receives a selection of an automation application (906). For example, the user may select the onDoorOpen App in FIG. 4A. In one embodiment, the secured device access method 900 presents a selection of automation applications to the user and the user may select an App to handle certain desirable events. From the selected App, the secured device access method 900 retrieves the App configuration information required for that App (908). In some embodiments, an automation application requests user input to select the desired devices to be accessed by the App and other user preferences, such as time and day of control or other control parameters. The secured device access method 900 may presents a user interface to the user to allow the user to select devices and preferences for configuring the App. The user interface may be presented through a mobile application on a mobile device or through a web browser in a computer device, such as a laptop. For example, the onDoorOpen App is configured to operate in response to an event on a source device (contact sensor) and turn on a target device (light) where the specific source device and target device can be specified by user preferences. In the user's physical graph, there may be more than one contact sensor and more than one lighting device. The onDoorOpen App therefore collects the configuration information needed to execute the App, including the device types that are called out by the App and the required capabilities for the devices called out by the App.

The secured device access method 900 filters the connected devices in the user's physical graph based on the requirements or specification of the App (910). Of all the connected devices in the user's physical graph, the secured device access method 900 selects those that meet the device type and the capabilities called out by the App. The list of possible source devices and target devices is then provided to the user through a user interface where the user may make selections. The secured device access method 900 then receives user configuration information for authorized devices (912). In particular, the secured device access method 900 receives configuration information identifying connected devices that are explicitly authorized by the user to be accessed by the selected App.

The secured device access method 900 then determines the optimal deployment strategy for the App and the App may be installed at the central server or at a hub (where applicable) (914). As a result of the installation of the automation application, the secured device access method 900 restricts the automation application to have access only to the authorized devices defined by the configuration information (916). In the present description, granting "access" to authorized devices refers to granting access to monitor and/or control the devices.

In some embodiments, the configuration information defines the level of access an automation application may have on the authorized device. Furthermore, in other embodiments, the configuration information defines the level of control an automation application may have on the authorized device. In some examples, the user may grant, through the configuration information, limited access ability or limited control by an automation application to a connected device in the user's environment. For instance, a user may grant permission for an automation application to read the status of a connected physical device but not to control the connected physical device. For example, a user may grant permission to an automation application to read the on/off status of a light but not to turn the light on or off. In another example, a user may grant permission to an automation application to lock a door but not to unlock the door.

The secured device access method of the present invention ensures security in a device automation environment where an automation application may have access to a user's connected physical devices only through the user's explicit authorization. In this manner, the user's automation environment is protected from unwelcomed intrusion or uninvited access.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing secured access to a device automation system implementing automatic control of one or more connected physical devices in a user's automation environment, the user's automation environment including a plurality of connected physical devices, connected to a data network to facilitate communication with a central server over the data network, the method comprising:

retrieving a physical graph describing the connected physical devices in the user's automation environment;

receiving, from a client device, a selection of an automation application, wherein the automation application comprises one or more event handlers, each event handler specifying an event and an action, and wherein an event handler is executed to issue the specified action in response to the specified event;

receiving application configuration information for the selected automation application, the application configuration information identifying one or more required device types and one or more required device capabilities;

automatically filtering the physical graph to identify one or more connected physical devices in the user's automation environment that are of the required device types and have the required device capabilities;

authorizing one or more of the identified connected physical devices for access by the selected automation application wherein the authorized one or more connected physical devices are a selected subset of and not all of the plurality of connected physical devices, the remaining connected physical devices being devices that are not authorized for access by the selected automation application;

installing the selected automation application in the device automation system; and in response to the installation of the selected automation application, restricting the installed automation application to access only the authorized connected physical devices, wherein the authorized connected physical devices are a subset of and not all of the plurality of connected physical devices in the user's automation environment, and the automation application does not have access to any of the connected physical devices that are not authorized.

2. The method of claim 1 further comprising:

causing a list of the identified connected physical devices to be presented to a user; and receiving a user initiated selection of the authorized connected physical devices.

3. The method of claim 1, wherein retrieving a physical graph describing the connected physical devices in the user's automation environment comprises:

retrieving a physical graph describing one or more hub connected physical devices and one or more hubs in the user's automation environment, the hub connected physical devices being configured to communicate with the central server through a hub, the hub connected physical devices being configured to receive commands from and issue data to the central server through the hub.

4. The method of claim 1, wherein retrieving a physical graph describing the connected physical devices in the user's automation environment comprises:
retrieving a physical graph describing one or more direct-cloud connected physical devices in the user's automation environment, the direct-cloud connected physical devices being configured to communicate directly with the central server, the direct-cloud connected physical devices being configured to receive commands from and issue data to the central server.

5. The method of claim 1, wherein retrieving a physical graph describing the connected physical devices in the user's automation environment comprises:
retrieving a physical graph describing one or more cloud-to-cloud connected physical devices in the user's automation environment, the cloud-to-cloud connected physical devices being configured to communicate with the central server through a third-party private data network, the cloud-to-cloud connected physical devices being configured to receive commands from and issue data to the central server through the third-party private data network.

6. The method of claim 1, wherein the received configuration information further defines a level of access authorized, wherein the level of access defines capabilities of the authorized one or more connected physical devices that the automation application may access.

7. The method of claim 1, wherein the received configuration information further defines a level of control authorized for each selected connected physical device, wherein the level of control defines the nature of the control that the automation application may exercise over the authorized one or more connected physical devices.

8. A system for providing an secured access to a device automation system implementing automatic control of one or more physical devices in a user's automation environment, the user's automation environment including a plurality of connected physical devices, connected to a data network to facilitate communication with a central server over the data network, the system comprising:
a central server connected to the data network, the central server comprising a processor configured to:
retrieve a physical graph describing the connected physical devices in the user's automation environment;
receive, from a client device, a selection of an automation application, wherein the automation application comprises one or more event handlers, each event handler specifying an event and an action, and wherein an event handler is executed to issue the specified action in the environment in response to the specified event;
receive application configuration information for the selected automation application, the application configuration information identifying one or more device types of interest and one or more required device capabilities;
automatically filtering the physical graph to identify one or more connected physical devices in the user's automation environment that are of the device types of interest and have the required device capabilities;
authorizing one or more of the identified connected physical devices for access by the selected automation application, wherein the authorized one or more connected physical devices are a selected subset of and not all of the plurality of connected physical devices, the remaining connected physical devices being devices that are not authorized for access by the selected automation application;
install the selected automation application; and
in response to the installation of the selected automation application, restrict the installed automation application to access only the authorized connected physical devices, configuration information, wherein the authorized connected physical devices are a subset of and not all of the plurality of connected physical devices in the user's automation environment, and the automation application does not have access to any of the connected physical devices that are not authorized; and
a memory coupled to the processor and configured to provide the processor with instructions.

9. The system of claim 8, wherein the processor is further configured to:
cause a list of the identified connected physical devices to be presented to a user; and
receive a user initiated selection of the authorized connected physical devices.

10. The system of claim 8, wherein the processor is further configured to:
retrieve a physical graph describing one or more hub connected physical devices and one or more hubs in the user's automation environment, the hub connected physical devices being configured to communicate with the central server through a hub, the hub connected physical devices being configured to receive commands from and issue data to the central server through the hub.

11. The system of claim 8, wherein the processor is further configured to:
retrieve a physical graph describing one or more direct-cloud connected physical devices in the user's automation environment, the direct-cloud connected physical devices being configured to communicate directly with the central server, the direct-cloud connected physical devices being configured to receive commands from and issue data to the central server.

12. The system of claim 8, wherein the processor is further configured to:
retrieve a physical graph describing one or more cloud-to-cloud connected physical devices in the user's automation environment, the cloud-to-cloud connected physical devices being configured to communicate with the central server through a third-party private data network, the cloud-to-cloud connected physical devices being configured to receive commands from and issue data to the central server through the third-party private data network.

13. The system of claim 8, wherein the received configuration information further defines a level of access authorized for the authorized connected physical device.

14. The system of claim 8, wherein the processor is further configured to:
received configuration information further defines a level of control authorized for the authorized one or more connected physical devices.

* * * * *

UNITED STATES PATENT AND TRADEMARK OFFICE
CERTIFICATE OF CORRECTION

PATENT NO. : 9,531,559 B1
APPLICATION NO. : 14/159400
DATED : December 27, 2016
INVENTOR(S) : Vlaminck et al.

Page 1 of 1

It is certified that error appears in the above-identified patent and that said Letters Patent is hereby corrected as shown below:

In the Specification

1. Column 5, Line 29, change "handers" to --handlers--.

2. Column 6, Line 62, change "handers" to --handlers--.

3. Column 7, Line 47, change "handers" to --handlers--.

4. Column 8, Line 9, change "hander" to --handler--.

5. Column 8, Line 11, change "hander" to --handler--.

6. Column 10, Line 21, change "hander" to --handler--.

In the Claims

1. In Line 3 of Claim 7 (Column 21, Line 33) remove "for each selected connected physical device".

2. In Lines 16 and 17 of Claim 8 (Column 21, Lines 52 and 53) remove "the environment in".

3. In Line 39 of Claim 8 (Column 22, Line 10) remove "configuration information".

Signed and Sealed this
Twenty-fifth Day of April, 2017

Michelle K. Lee
*Director of the United States Patent and Trademark Office*